US008676844B2

(12) United States Patent
Sityon et al.

(10) Patent No.: US 8,676,844 B2
(45) Date of Patent: Mar. 18, 2014

(54) GRAPH AUTHORIZATION

(75) Inventors: Arik Sityon, Petach Tiqwa (IL); Uri Ben-Dor, Givat Shmuel (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/696,398

(22) PCT Filed: May 26, 2010

(86) PCT No.: PCT/US2010/036107
§ 371 (c)(1),
(2), (4) Date: Nov. 6, 2012

(87) PCT Pub. No.: WO2011/149453
PCT Pub. Date: Dec. 1, 2011

(65) Prior Publication Data
US 2013/0060758 A1    Mar. 7, 2013

(51) Int. Cl.
*G06F 17/30*    (2006.01)

(52) U.S. Cl.
USPC .......................................................... 707/783

(58) Field of Classification Search
USPC .......................................................... 707/783
See application file for complete search history.

(56) References Cited

U.S. PATENT DOCUMENTS

| 7,424,530 | B2 * | 9/2008 | Chagoly et al. | 709/224 |
| 2005/0132054 | A1 * | 6/2005 | Chang et al. | 709/227 |
| 2006/0021009 | A1 * | 1/2006 | Lunt | 726/4 |
| 2006/0075469 | A1 * | 4/2006 | Vayman | 726/2 |
| 2007/0240203 | A1 * | 10/2007 | Beck | 726/4 |

* cited by examiner

*Primary Examiner* — Joshua Bullock

(57) ABSTRACT

Systems, methods, and other embodiments associated with graph authorization are described. One example method includes detecting that a user query shares a hook node with an authorization query. The example method may also include generating a base result graph by executing the user query on a base graph and generating an authorized graph by executing the authorization query on the base result graph. The method may also include providing the authorized graph.

15 Claims, 6 Drawing Sheets

GRAPH AUTHORIZATION

BACKGROUND

An Information Technology (IT) infrastructure includes IT assets, components, systems, applications, and resources within a particular environment (e.g., an organization). Directed graphs can be used to model the IT infrastructure by providing a graphical representation of relationships within the IT infrastructure. Security measures are typically implemented within the directed graphs to protect the underlying IT infrastructure. Security measures can protect the IT infrastructure from unauthorized access, unintended modification, malicious attacks, and so on. Graph authorization is a type of security measure that can be used to authorize access to portions of the IT infrastructure for a user or a group of users.

Conventional graph authorization techniques may be inefficient, difficult to maintain, and too complex. Conventionally, when an administrator tried to restrict a group of users to a portion of the model, elements of queries received from the group were modified to contain limiting rules to restrict results. The results were restricted to contain only components that the group of users should have access to. In addition the administrator was usually forced to manually maintain authorization at a Configuration Item level (e.g. the CI level: an object or link in the CMDB model) making sure it is always consistent with the required policy for each group of users. This may be a simple task for a small organization with a small amount of users. However, as the IT infrastructure grows, and more users utilize the IT infrastructure, it becomes difficult to maintain customized limiting rules for different groups of users, especially because each new query must be modified to comply with the limiting rules. Manually modifying queries is inefficient and error prone. This is not practical in practice because a trivial way to solve the problem is to manually keep authorization information over every CI and make sure all CIs shown to the user pass a security policy filter. This process leaves the data base administrator to determine how to define authorization polices for millions of CIs. Since this would be an enormous manual task, some kind of a script could be created to run periodically and insert the authorization policy information. Even with a script, the administrator would have to convert the authorization policy to script somehow and accept the fact that when the data base changes it can be in a non-consistent state with respect to the authorization policy until the next script execution. Even modifying queries automatically may be processing intensive and complex. Furthermore, as the IT infrastructure continues to grow, the limiting rules may also become more complex.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Methods and systems associated with graph authorization are described. In one embodiment, an authorization model is implemented by a set of predefined authorization topological queries. In one example, a configuration management data base (CMDB) maintains a graph representation of an Information Technology (IT) infrastructure and enables a user to run topological queries using a topological query language (TQL). Systems and methods are provided that allow a CMDB administrator to define authorization rules for each group of application owners. The rules define, for a given query, a partial result that the particular group can see. The technology disclosed herein enables the implementation of CI level authorization not only over ad hoc queries but also over active queries, sending deltas in the query result upon a change in the CMDB model. One effect is that virtual queries can be held on top of a user's query.

One example method includes detecting that a user query shares a hook node with an authorization query. A hook node may be associated with a class of nodes. For example, in one graph, nodes associated with host locations (e.g., internet protocol (IP) addresses) may be considered hook nodes. The authorization query may restrict access to hook nodes by denoting which users and/or groups of users may access a hook node. In response to detecting the shared hook node, the example method may also include generating a base result graph by executing the user query on a base graph. The example method may also include generating an authorized graph by executing the authorization query on the base result graph. The example method may also include providing the authorized graph. Executing the authorization query on the base result graph may be faster than modifying the base query and executing the modified base query. This may be because the base result graph will typically be substantially smaller in size than the base graph. Thus, executing another query on this small subset of the base graph may be faster than transforming a query and executing the modified query.

In one manner, this can be viewed as a single query result, which is consumed by many groups/users where each receives the query result filtered by a different filter. The authorization queries are the filters which are automatically applied. So while the user believes he/she receives results for the query that the user defined, the user is actually receiving a result of a virtual computational entity that is automatically generated on top of the user query.

Figure 1:
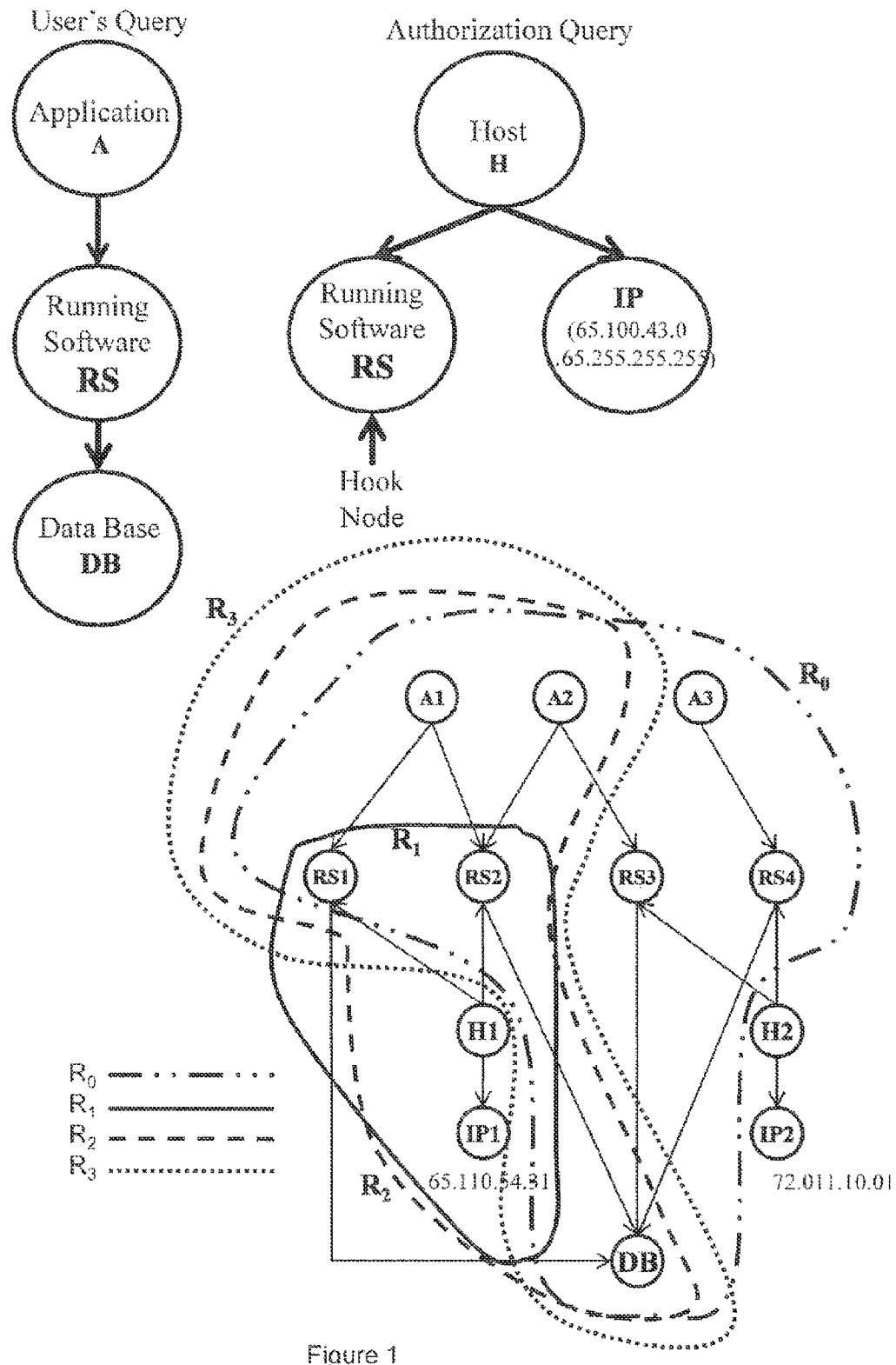
FIG. 1 illustrates an example of processing a user query and various results of the query.

With reference to FIG. 1, consider an example of a user's query and an authorization query as shown. The authorization query may limit the available IP domain (e.g. IP 65.100.43.0 ... 65.255.255.255). The original user's query result (denoted as $R_O$) holds all the applications "A", running software RS, hosts H, databases DB and the links between these objects (e.g. the dashed line contains the objects that are contained in the query result). Result $R_O$ contains objects A1-A3, RS1-

RS4, DB, and their associated links. The authorization query is then calculated over the CMDB model where the hook node is restricted by the applications in result $R_0$. The new result would be $R_1$, which contains objects RS1, RS2, H1, IP1, and their associated links. Then a computational entity $V_1$ is defined, which is an intersection of the user's query and the authorization query at the running software RS node of the two queries. Its result is $R_2$, which contains objects A1, A2, RS1, RS2, H1, IP1, and their associated links. A third computational entity $V_2$ is defined as a projection of the user's query over the $V_1$ and its result. Upon completion, result $R_3$ is the filtered result the user receives/sees. Result $R_3$ includes objects A1 A2, RS1, RS2, and DB because the projection function filters the host H1 and the IP1 from the result since they are not in the domain of the user's query.

In one example, the authorization query contains the hook node and a filter rule. The hook node can represent an element of an IT infrastructure. The element of the IT infrastructure could be a server, an application, a database, and so on. A restriction is defined by a topological query and is not restricted to property conditions over the hook node (e.g. example in FIG. 1. When the user query and the authorization query share a hook node, restricting a result of the user query according to the authorization query may limit the results of the user query based on the filter rule associated with the hook node. Thus, the user only has access to an authorized portion of the base graph. Therefore, the authorized graph can provide security to the underlying base graph by limiting user access.

Additionally, in one example, the authorization query may be part of an authorization policy for the group of users. The authorization policy may contain a set of authorization queries for group of users of an organization. The authorization policy may streamline the security maintenance process because an update, addition, or deletion to an authorization query may be automatically applied to queries run on the base graph. It also allows resource sharing between users of different groups, by consuming the result of the same topological query filtered by different sets of authorization rules.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example( ) so described may include a particular feature, structure, characteristic, property, element, or limitation, but that not every embodiment or example necessarily includes that particular feature, structure, characteristic, property, element, or limitation. Furthermore, repeated use of the phrase "in one embodiment" does not necessarily refer to the same embodiment, though it may.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an Application Specific Integrated Circuit (ASIC), a Compact Disc (CD), other optical medium, a Random-access Memory (RAM), a Read-only Memory (ROM), a memory chip or card, a memory stick, and other media from which a computer, a processor or other electronic device can read.

In some examples, "database" is used to refer to a table maintained in one or more non-transitory computer-readable mediums. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, instructions stored in memory or non-transitory computer-readable medium, instructions in execution on a machine, and/or combinations of each to perform a function(s) or an action(s), and/or to cause a function or action from another logic, method, and/or system. Logic may include an instruction controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Query" as used herein, refers to a semantic construction that facilitates gathering and processing information. A query may be formulated in a database query language, an Object Query Language (OQL), a natural language, and so on.

"User", as used herein, includes but is not limited to one or more persons, logics, computers or other devices, or combinations of these.

Figure 2:
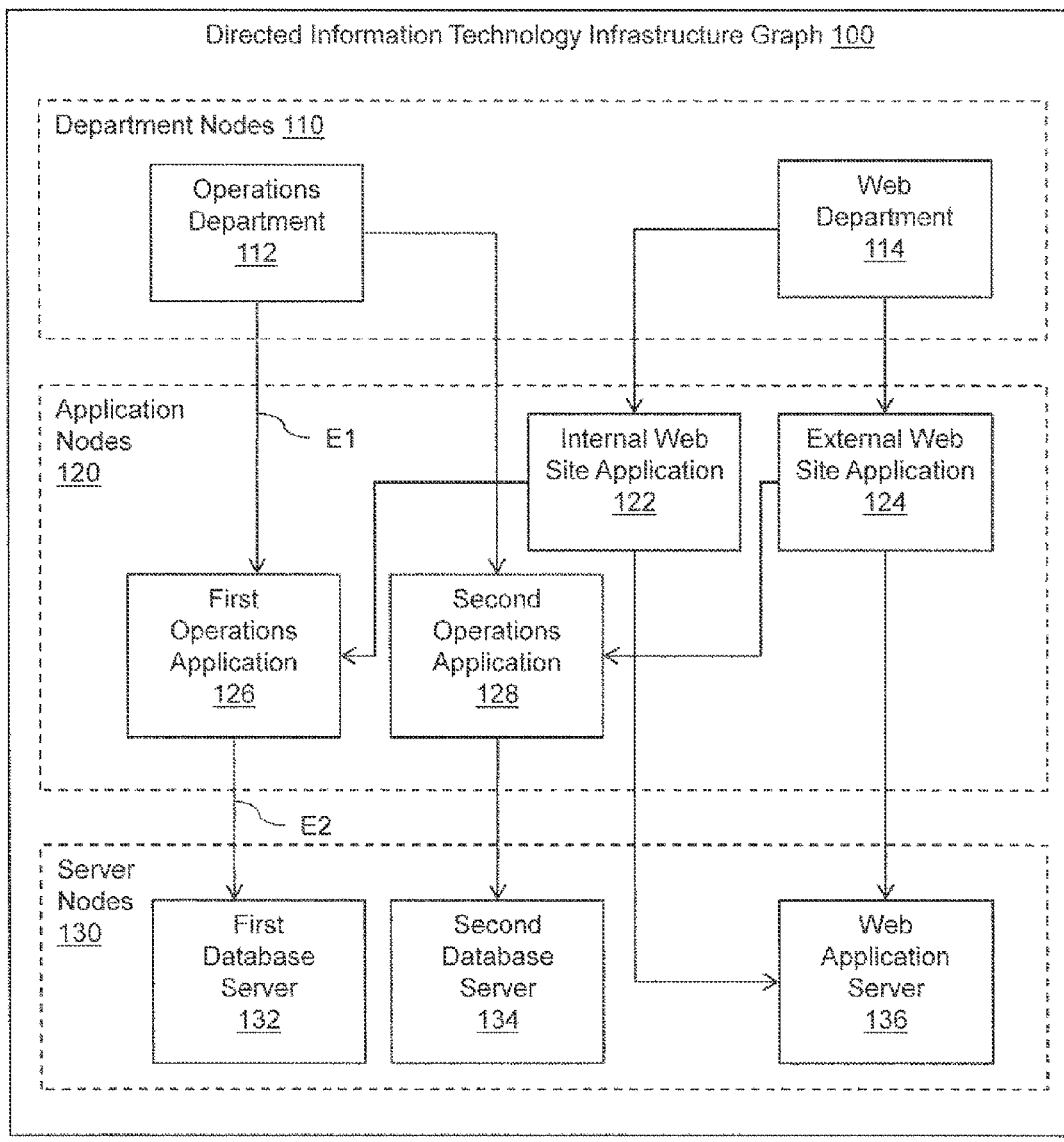
FIG. 2 illustrates an embodiment of a directed information technology infrastructure graph with which example methods, systems, and equivalents may interact.

FIG. 2 shows an embodiment of a directed graph 100 of relationships between entities in a portion of an example IT infrastructure. The graph 100 includes several department nodes 110 (e.g., operations department node 112, web department node 114) that may correspond to departments that are responsible for maintaining entities associated with application nodes 120 and/or server nodes 130. Thus, a node in an IT infrastructure graph may not necessarily be tied to a specific tangible item and may, for example, facilitate illustrating relationships between an IT infrastructure and an organizational structure. Furthermore, while several nodes and edges are shown in the graph 100, a person having ordinary skill in the art will recognize that this may not be an exhaustive list of nodes and edges, and that the categories of what nodes represent are merely chosen for example purposes and that other organizational schema may be applicable.

The graph 100 also includes several application nodes 120 (e.g., internal web site application node 122, external web site application node 124, first operations application node 126, second operations application node 128) that may represent applications and/or computers on which the applications are operating. The graph 100 also includes several server nodes 130 (e.g., first database server node 132, second database server node 134, web application server node 136) that may represent servers.

In this example, the directed edges in the graph are represented by arrows and illustrate relationships between components of the IT infrastructure. For example, a first edge E1 connecting the operations department node 112 to the first operations application node 126 may represent the fact that the operations department of the company is responsible for managing a first operations application. A second edge E2 connecting the first operations application node 126 to the first database server node 132 may represent the fact that the first operations application relies on data from a first database server. While a directed graph is shown, a person having ordinary skill in the art will recognize that an undirected graph or a graph using some other organization scheme may also be used to represent a company's IT infrastructure.

Methods, systems, and equivalents associated with graph authorization may interact with graph 100. For example, graph authorization can be used to protect graph 100 from unauthorized access, unintended modification, malicious attacks, and so on. In one illustrative example, graph 100 may represent an IT infrastructure. Many users may be accessing and working with the information and services represented by graph 100. For example, web department 114 may represent a group of users who manage data associated with clients from a particular region. The users may utilize external web site application 124 to look up data, modify data, and so on. External website application 124 may rely on data from web application server 136. It is to be appreciated that web application server 136 may include multiple servers. The server may have its own Internet Protocol (IP) address. In one example, which will be discussed in detail below, graph authorization can be used to restrict access to web application servers by IP address.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities.

It has proven convenient at times, principally for reasons of common usage, to refer to these physical quantities as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 3:
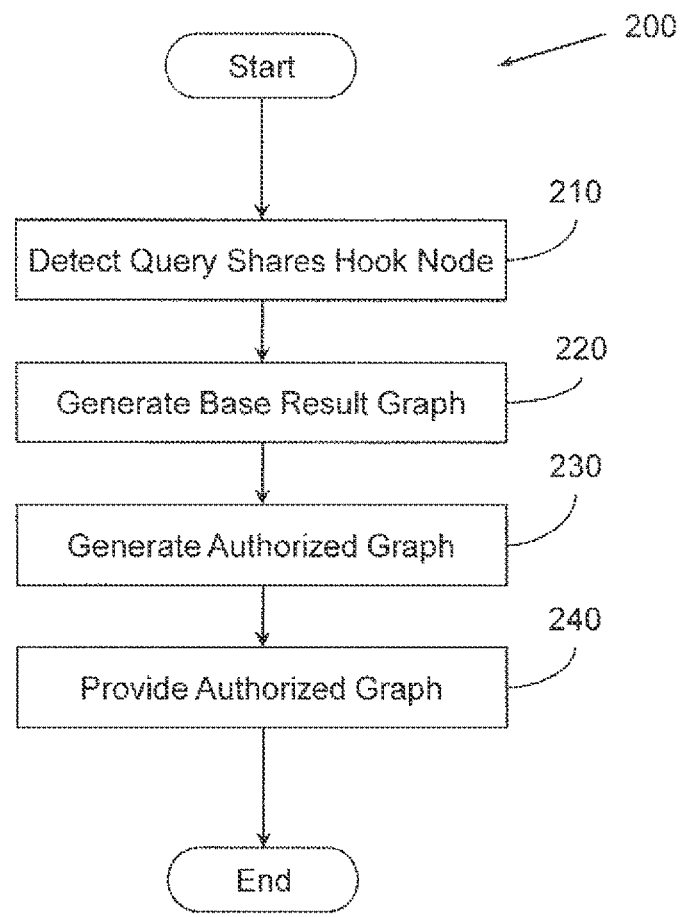
FIG. 3 illustrates an embodiment of a method associated with graph authorization.

FIG. 3 illustrates an embodiment of a method 200 associated with graph authorization. At 210, method 200 includes detecting that a user query shares a hook node with an authorization query. The hook node may be associated with an element of an information technology (IT) infrastructure such as graph 100 (see FIG. 2). The hook node may be associated with a specific node (e.g., Operations Department node 112) or with a type of node (e.g., database server nodes). In one example, a hook node may not have distinguishing attributes beyond being shared between the user query and the authorization query. However, in another example, hook nodes may be special nodes that are attached to specific nodes in an IT infrastructure for the purposes of managing authorization. The authorization query may comprise the hook node and a filter rule. The filter rule may be a condition associated with the hook node. The condition may facilitate restricting access to nodes sharing an attribute with the hook node. In one example, the authorization query may be a part of an authorization policy. The authorization policy may comprise a set of authorization queries associated with users that access the base graph. At 220, method 200 includes generating a base result graph by executing the user query on a base graph. At 230, method 200 includes generating an authorized graph by executing the authorization query on the base result graph. At 240, method 200 includes providing the authorized graph. In one example, the authorized graph is provided to a user that generated the user query.

Referring back to graph 100 (FIG. 2), a user working on a company's external website application may be interested in finding out information associated with applications associated with the external web site as well as information associated with databases associated with the applications. Thus, the user may generate a user query containing an operations application node connected to a second database server node. Running this query on graph 100 may result in a graph containing a first sub-graph comprising a node associated with first operations application node 126 connected to a node associated with first database server node 132. The graph may also contain a second sub-graph comprising a node associated with second operations application node 128 connected to a node associated with second database server 134. However, operations application nodes may be considered hook nodes by an authorization policy associated with the graph 100. The authorization policy may have an authorization query that specifies what operations applications nodes the user should have access to. By running the authorization query on the graph generated by the user query, the graph may be restricted to the second sub-graph. A person having ordinary skill in the art will recognize that many attributes could be used to restrict the graph (e.g., I.P. Address, physical location, association to other nodes in the base graph).

While FIG. 3 illustrates various actions occurring in serial, it is to be appreciated that various actions illustrated in FIG. 3 could occur substantially in parallel. By way of illustration, a first process could detect a shared hook node, a second process could generate base result graph, a third process could generate the authorized graph, and a fourth process could provide the authorized graph. While four processes are described, it is to be appreciated that a greater and/or lesser number of processes could be employed and that lightweight processes, regular processes, threads, and other approaches could be employed.

In one example, a method may be implemented as stored computer executable instructions. Thus, in one example, a non-transitory computer-readable medium stores computer executable instructions that if executed by a machine (e.g., processor) cause the machine to perform a method 200. While executable instructions associated with method 200 are described as being stored on a computer-readable medium, it is to be appreciated that executable instructions associated with other example methods described herein may also be stored on a computer-readable medium.

Figure 4:
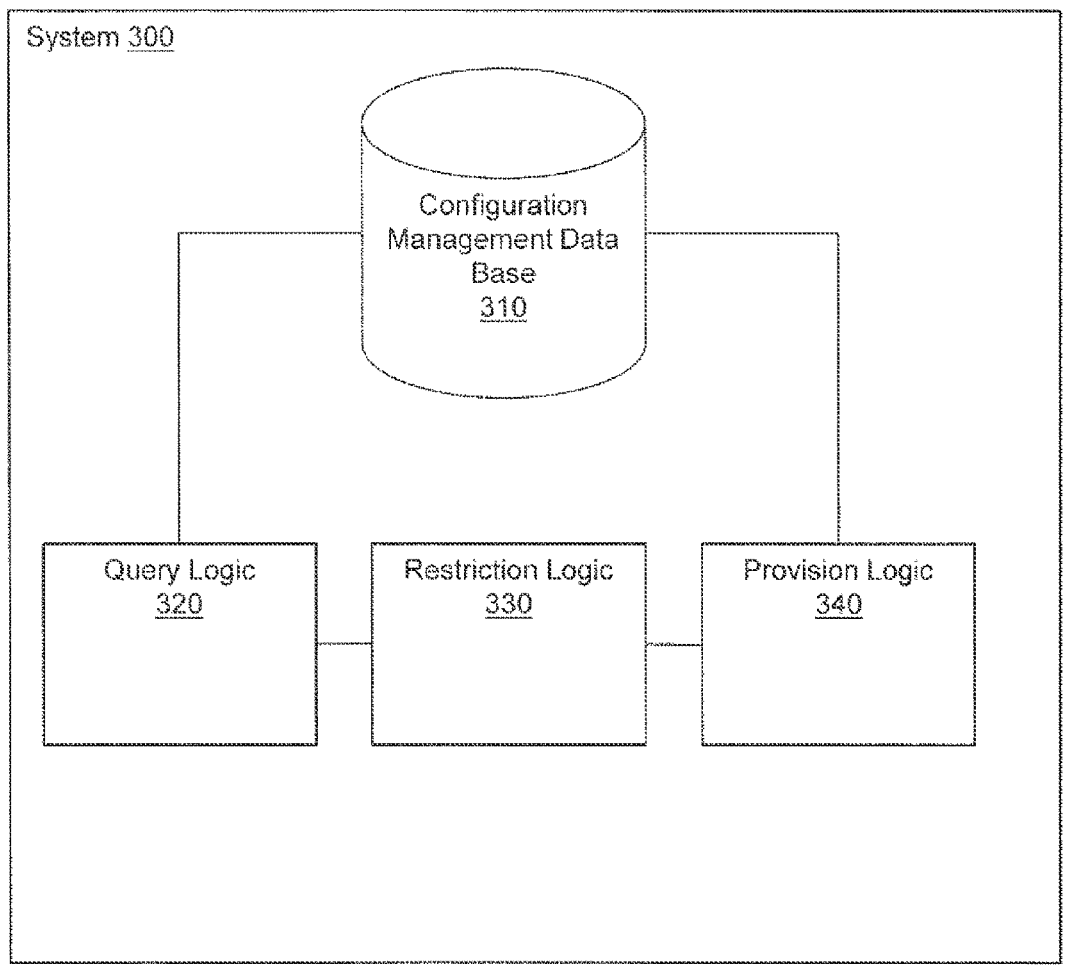
FIG. 4 illustrates an embodiment of a system associated with graph authorization.

FIG. 4 illustrates an embodiment of a system 300 associated with graph authorization. System 300 includes a Configuration Management Data Base (CMDB) 310 that is maintained in one or more non-transitory computer-readable mediums. CMDB may store descriptions of components of an IT infrastructure. CMDB 310 also stores a base graph describing relationships between components of the IT infrastructure. The base graph may be a directed graph and may resemble, for example, graph 100 (FIG. 2). Graph authorization can protect the base graph from unauthorized access, unintended modification, malicious attacks, and so on.

System 300 also includes query logic 320. Query logic 320 executes a base topological query on the base graph to produce a base result graph. System 300 also includes restriction logic 330. Restriction logic 330 is implemented to restrict the base result graph as a function of a filter query to produce an authorized graph. Restriction logic 330 may restrict the base result graph upon detecting a hook node in the base topological query that is shared with the filter query. Restricting the base result graph as a function of the filter query may comprise controlling the query logic to execute the filter query on the base result graph. The filter query may comprise the hook node and a filter rule. The hook node may be associated with a component of the IT infrastructure. The filter rule may facilitate restricting access to nodes associated with the component of the IT infrastructure. System 300 also includes provision logic 340. Provision logic 340 is configured to provide the authorized graph (e.g. transmit an electronic form of the graph, display the graph on a display screen, and so on).

Figure 5:
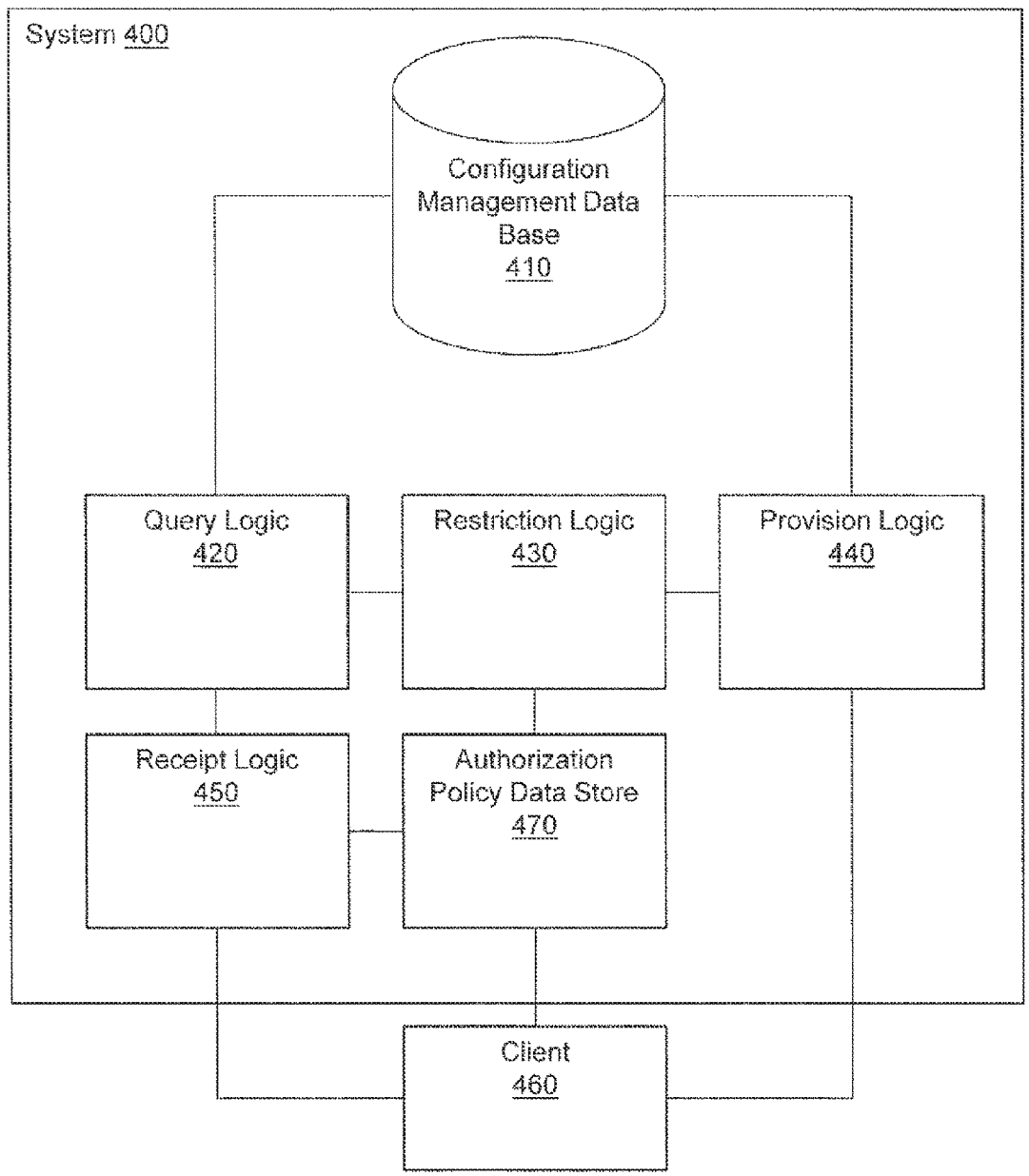
FIG. 5 illustrates another embodiment of a system associated with graph authorization.

FIG. 5 illustrates an example embodiment of a system 400 associated with graph authorization. System 400 includes several elements similar to those described in reference to system 300 (FIG. 4). For example, system 400 includes a Configuration Management Data Base (CMDB) 410 stored in a data store, query logic 420, restriction logic 430, and provision logic 440, which are implemented similarly to the corresponding elements 320, 330, and 340 in FIG. 4, respectively. However, system 400 includes additional elements. System 400 also includes receipt logic 450. Receipt logic 450 is implemented to receive the base topological query from a client 460. In this example, the base topological query may be provided to the client 460. System 400 also includes an authorization policy data store 470. The authorization policy data store 470 is used to store the filter query used by the restriction logic 430.

Figure 6:
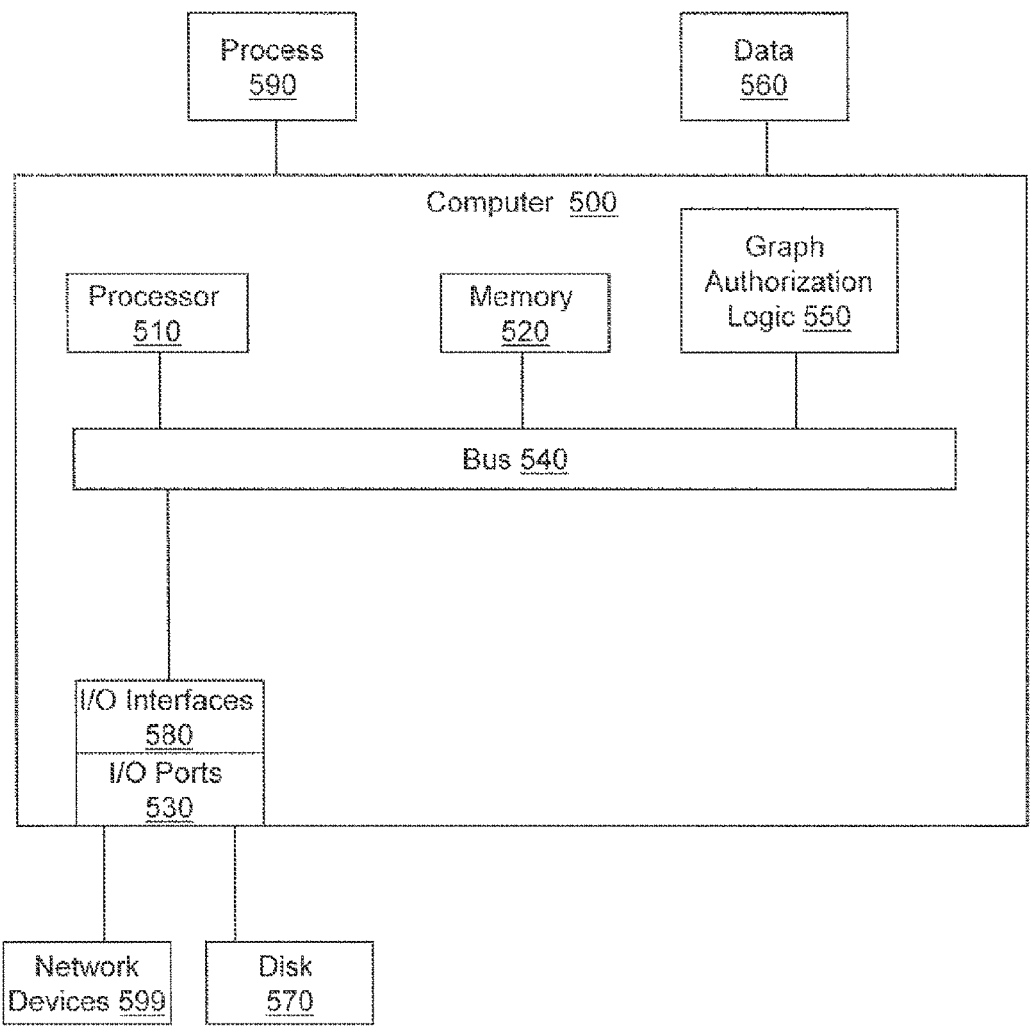
FIG. 6 illustrates an embodiment of a computing environment in which example methods, systems, and equivalents, may operate.

FIG. 6 illustrates an embodiment of a computing device in which example systems and methods described herein, and equivalents, may operate. The example computing device may be a computer 500 that includes a processor 510, a memory 520, and Input/Output (I/O) ports 530 operably connected by a bus 540. In one example, the computer 500 may include a graph authorization logic 550 configured to provide security to an IT infrastructure by limiting access to components of the IT infrastructure. In different examples, the graph authorization logic 550 may be implemented in hardware, instructions in memory, instructions in execution, firmware, and/or combinations thereof. While the graph authorization logic 550 is illustrated as a hardware component attached to the bus 540, it is to be appreciated that in one example, the graph authorization logic 550 could be implemented in the processor 510.

The graph authorization logic 550 may provide means (e.g., hardware, instructions in memory, instructions in execution, firmware) for executing a topological query on a base graph to generate a first result graph. The means may be implemented, for example, as an ASIC. The means may also be implemented as computer executable instructions that are presented to computer 500 as data 560 that are temporarily stored in memory 520 and then executed by processor 510. The graph authorization logic 550 may also provide means (e.g., hardware, instructions in memory, instructions in execution, firmware) for executing a security query on the first result graph to generate a second result graph upon detecting the topological query shares a hook node with the security query. The graph authorization logic 550 may also provide means (e.g., hardware, instructions in memory, instructions in execution, firmware) for providing the second result graph.

Generally describing an example configuration of the computer 500, the processor 510 may be a variety of various processors including dual microprocessor and other multi-processor architectures. A memory 520 may include volatile memory (e.g., a RAM) and/or non-volatile memory (e.g., a ROM).

A disk 570 may be operably connected to the computer 500 via, for example, an input/output interface (e.g., card, device) 580 and an input/output port 510. The disk 570 may be, for example, a computer-readable storage medium (e.g. as defined previously under "computer-readable medium"), a magnetic disk drive, a solid state disk drive, a floppy disk drive, a tape drive, a Zip drive, an optical media, a flash memory card, a memory stick, and so on. The memory 520 can store a process 590 and/or a data 560, for example. The disk 570 and/or the memory 520 can store an operating system that controls and allocates resources of the computer 500.

The bus 540 may be a single internal bus interconnect architecture and/or other bus or mesh architectures. While a single bus is illustrated, it is to be appreciated that the computer 500 may communicate with various devices, logics, and peripherals using other busses (e.g., Peripheral Component Interconnect Express (PCIE), 1394, Universal Serial Bus (USB), Ethernet). The bus 540 can be types including, for example, a memory bus, a memory controller, a peripheral bus, an external bus, a crossbar switch, and/or a local bus.

The computer 500 may interact with input/output devices via the I/O interfaces 580 and the input/output ports 530. Input/output devices may be, for example, a keyboard, a microphone, a pointing and selection device, cameras, video cards, displays, the disk 570, network devices 599, and so on. The input/output ports 530 may include, for example, serial ports, parallel ports, and USB ports.

The computer 500 can operate in a network environment and thus may be connected to the network devices 599 via the I/O interfaces 580, and/or the I/O ports 530. Through the network devices 599, the computer 500 may interact with a network. Through the network, the computer 500 may be logically connected to remote computers. Networks with which the computer 500 may interact include, but are not limited to, a Local Area Network (LAN), a Wide Area Network (WAN), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that when executed by a computer cause the computer to perform a method, the method comprising:
   detecting that a user query shares a hook node with an authorization query,
   generating a base result graph by executing the user query on a base graph in response to the detected user query;
   generating an authorized graph by executing the authorization query on the base result graph; and
   providing the authorized graph in an electronic form.

2. The non-transitory computer-readable medium of claim 1, where the hook node is associated with an element of an information technology (IT) infrastructure.

3. The non-transitory computer-readable medium of claim 1, where the authorization query comprises the hook node and a filter rule.

4. The non-transitory computer-readable medium of claim 3, where the filter rule is a condition associated with the hook node.

5. The non-transitory computer-readable medium of claim 4, where the condition facilitates restricting access to nodes sharing an attribute with the hook node.

6. The non-transitory computer-readable medium of claim 1, where the authorization query is part of an authorization policy.

7. The non-transitory computer-readable medium of claim 6, where the authorization policy comprises a set of authorization queries associated with users that access the base graph.

8. The non-transitory computer-readable medium of claim 1, where the user query is received from a user, and where the authorized graph is provided to the user.

9. A system, comprising:
   a configuration management data base (CMDB) maintained in one or more non-transitory computer-readable mediums to store descriptions of components of an information technology (IT) infrastructure and to store a base graph describing relationships between components of the IT infrastructure;
   a query logic to execute a base topological query on the base graph to produce a base result graph;
   a restriction logic to restrict the base result graph as a function of a filter query to produce an authorized graph upon detecting a hook node in the base topological query that is shared with the filter query; and
   a provision logic to provide the authorized graph.

10. The system of claim 9, where the filter query comprises the hook node and a filter rule, where the hook node is associated with a component of the IT infrastructure.

11. The system of claim 10, where the filter rule facilitates restricting access to nodes associated with the component of the IT infrastructure.

12. The system of claim 9, comprising a receipt logic to receive the base topological query from a client, and where the provision logic provides the authorized graph to the client.

13. The system of claim 9, where restricting the base result graph as a function of the filter query comprises controlling the query logic to execute the filter query on the base result graph.

14. The system of claim 9, comprising an authorization policy data store to store the filter query.

15. A system, comprising:
   means for executing a topological query on a base graph to generate a first result graph;
   means for executing a security query on the first result graph to generate a second result graph upon detecting the topological query shares a hook node with the security query; and
   means for providing the second result graph.

* * * * *